UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

MANUFACTURE AND PRODUCTION OF OXYCARBOXYDIARYLCARBINOLS.

1,082,574.  Specification of Letters Patent.  Patented Dec. 30, 1913.

No Drawing.  Application filed October 15, 1912.  Serial No. 725,864.

*To all whom it may concern:*

Be it known that I, MAX WEILER, doctor of philosophy, chemist, citizen of the German Empire, residing at Elberfeld, Germany, have invented new and useful Improvements in Manufacture and Production of Oxycarboxydiarylcarbinols, of which the following is a specification.

My invention relates to the production of oxycarboxydiarylcarbinols, which can be obtained by condensing in equimolecular proportions aromatic aldehydes with aromatic oxycarboxylic acids. The new products are slightly-colored powders of the following general formula:

where R is an aromatic radical and R' an aromatic oxycarboxylic acid radical, which yield, when condensed with a further molecule of a suitable aromatic oxycarboxylic acid leucotriarylmethane bodies, capable of being converted by oxidation into mordant dyestuffs.

In order to illustrate the new process more fully the following example is given, the parts being by weight:— 17.7 parts of para-diethylaminobenzaldehyde are dissolved in 250 parts of sulfuric acid (60–66° Bé.) and 16.6 parts of s-xylenol-ortho-carboxylic acid (M. P. 166°; obtained from s-xylenol-sodium and carbonic acid) are added to this solution while it is being stirred and cooled.

The reaction proceeds as illustrated by the following graphic equation:

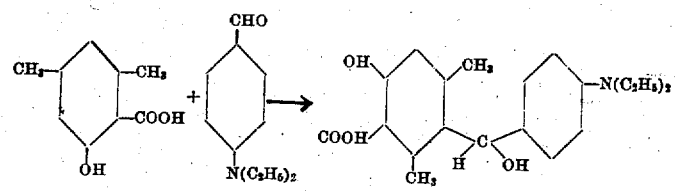

The brownish melt is then poured on ice and the hydrol which separates is filtered off. The leuco acid obtained by condensation of this hydrol with ortho-cresotinic acid, yields, when oxidized, a dyestuff producing on wool after chroming violet shades.

Instead of the above mentioned aldehyde other aldehydes, such as ortho-chloro-para-diethylaminobenzaldehyde, ortho - chloro - benzaldehyde, poly - chlorobenzaldehydes, sulfobenzaldehyde, etc., can be used.

The oxyacid of the example can be replaced by other oxyacids e. g. meta- or para-cresotinic acid, 3-methyl-2-oxy-4-chlorobenzoic acid, 2-naphthol-3-carboxylic acid and their monosulfonic acids, etc. The condensation can also be performed in other ways, for instance by heating with sulfuric acid (50 per cent.), with alcoholic sulfuric acid or with other condensing agents.

I claim:—

1. As new products the new oxycarboxydiarylcarbinols obtained by condensing in equal molecular proportions aromatic aldehydes with aromatic oxycarboxylic acids and containing both a hydroxyl and a carboxyl group in the same aryl nucleus, which products are after being dried and pulverized slightly colored powders, which yield, when condensed with a further molecule of an aromatic oxycarboxylic acid leucotriphenylmethane bodies capable of being converted by oxidation into mordant dyestuffs, substantially as described.

2. As new products the oxycarboxydiaryl-carbinols obtainable by condensing in equal molecular proportions alkylamino substituted aldehydes and aromatic oxycarboxylic acids and having a constitution corresponding to the formula

where R' is the radical of an aromatic oxycarboxylic acid and R an alkylamino substituted aromatic radical, which products are after being dried and pulverized slightly colored powders, which yield, when condensed with a further molecule of an aromatic oxycarboxylic acid leucotriphenylmethane bodies capable of being converted by oxidation into mordant dyestuffs, substantially as described.

3. As a new product the new dimethyloxy-carboxyphenyldiethyamidophenylcarbinol obtained by condensing in equal molecular proportions paradiethyl-aminobenzaldehyde with s-xylenol-ortho-carboxylic acid, having a constitution corresponding to the formula;

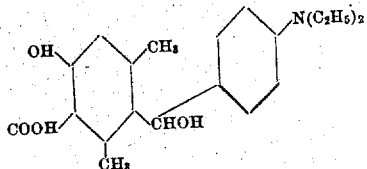

which product is after being dried and pulverized a slightly colored powder which yields, when condensed with a further molecule of ortho-cresotinic acid, a leuco-triphenylmethane body capable of being converted by oxidation into a mordant dyestuff producing on chrome mordanted wool violet shades.

In testimony whereof I have hereunto set my hand in the presence of two subscribing witnesses.

MAX WEILER. [L. S.]

Witnesses:
 CHAS. J. WRIGHT,
 ALBERT NUFER.

Copies of this patent may be obtained for five cents each, by addressing the "Commissioner of Patents, Washington, D. C."

---

Correction in Letters Patent No. 1,082,574.

It is hereby certified that in Letters Patent No. 1,082,574, granted December 30, 1913, upon the application of Max Weiler, of Elberfeld, Germany, for an improvement in "The Manufacture and Production of Oxycarboxydiarylcarbinols," an error appears in the printed specification requiring correction as follows: Page 2, line 2, for the word "carboxyphenyldiethyamidophenylcarbinol" read *carboxyphenyldiethylamidophenylcarbinol*; and that the said Letters Patent should be read with this correction therein that the same may conform to the record of the case in the Patent Office.

Signed and sealed this 3rd day of March, A. D., 1914.

[SEAL.]

J. T. NEWTON,
*Acting Commissioner of Patents.*

3. As a new product the new dimethyloxy-carboxyphenyldiethyamidophenylcarbinol obtained by condensing in equal molecular proportions paradiethyl-aminobenzaldehyde with s-xylenol-ortho-carboxylic acid, having a constitution corresponding to the formula;

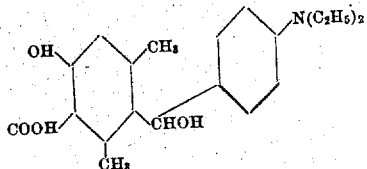

which product is after being dried and pulverized a slightly colored powder which yields, when condensed with a further molecule of ortho-cresotinic acid, a leuco-triphenylmethane body capable of being converted by oxidation into a mordant dyestuff producing on chrome mordanted wool violet shades.

In testimony whereof I have hereunto set my hand in the presence of two subscribing witnesses.

MAX WEILER. [L. S.]

Witnesses:
 CHAS. J. WRIGHT,
 ALBERT NUFER.

Copies of this patent may be obtained for five cents each, by addressing the "Commissioner of Patents, Washington, D. C."

---

Correction in Letters Patent No. 1,082,574.

It is hereby certified that in Letters Patent No. 1,082,574, granted December 30, 1913, upon the application of Max Weiler, of Elberfeld, Germany, for an improvement in "The Manufacture and Production of Oxycarboxydiarylcarbinols," an error appears in the printed specification requiring correction as follows: Page 2, line 2, for the word "carboxyphenyldiethyamidophenylcarbinol" read *carboxyphenyldiethylamidophenylcarbinol;* and that the said Letters Patent should be read with this correction therein that the same may conform to the record of the case in the Patent Office.

Signed and sealed this 3rd day of March, A. D., 1914.

[SEAL.]

J. T. NEWTON,
*Acting Commissioner of Patents.*

It is hereby certified that in Letters Patent No. 1,082,574, granted December 30, 1913, upon the application of Max Weiler, of Elberfeld, Germany, for an improvement in "The Manufacture and Production of Oxycarboxydiarylcarbinols," an error appears in the printed specification requiring correction as follows: Page 2, line 2, for the word "carboxyphenyldiethyamidophenylcarbinol" read *carboxyphenyldiethylamidophenylcarbinol;* and that the said Letters Patent should be read with this correction therein that the same may conform to the record of the case in the Patent Office.

Signed and sealed this 3rd day of March, A. D., 1914.

[SEAL.]

J. T. NEWTON,
*Acting Commissioner of Patents.*